No. 704,416. Patented July 8, 1902.
C. B. & F. WHITE.
SPRING BED BOTTOM.
(Application filed Apr. 4, 1902.)
(No Model.)
Fig. 1.
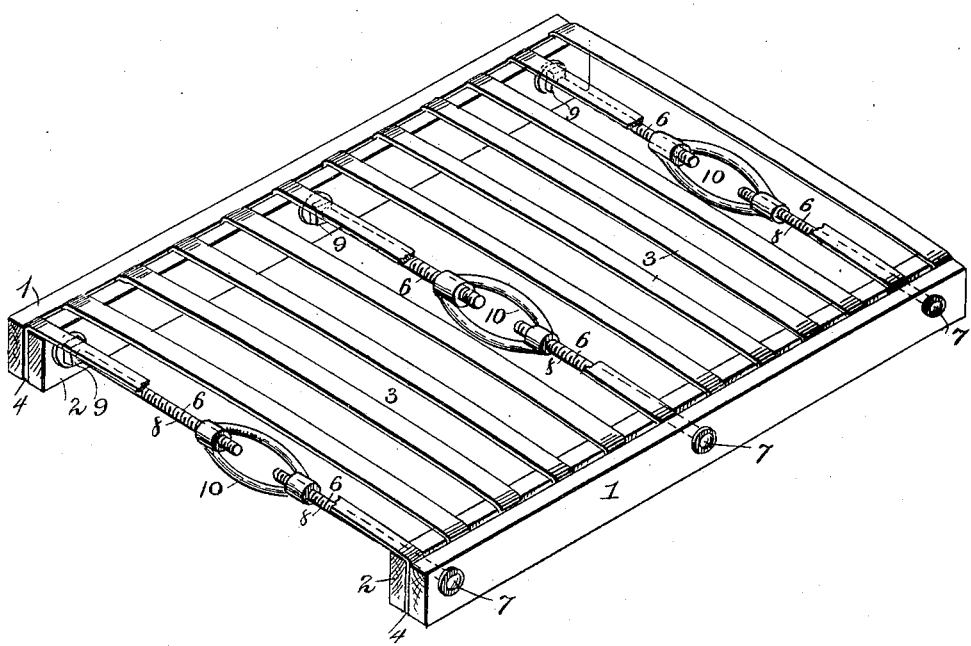
Fig. 2.
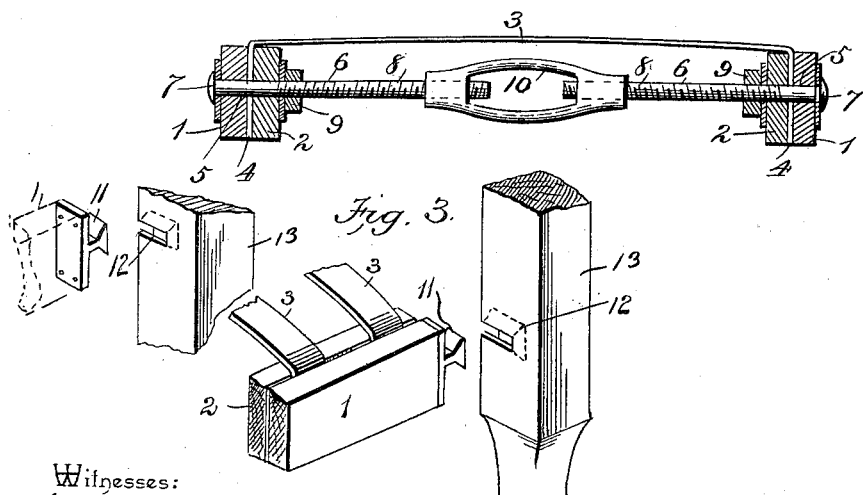
Fig. 3.
Witnesses:
F. L. Ourand
Frank G. Radelfinger
Inventors:
Charles B. White
Franklin White
by Louis Bagger & Co.,
Attorneys.

UNITED STATES PATENT OFFICE.

CHARLES B. WHITE AND FRANKLIN WHITE, OF LANDOVER, MARYLAND.

SPRING BED-BOTTOM.

SPECIFICATION forming part of Letters Patent No. 704,416, dated July 8, 1902.

Application filed April 4, 1902. Serial No. 101,410. (No model.)

*To all whom it may concern:*

Be it known that we, CHARLES B. WHITE and FRANKLIN WHITE, citizens of the United States, residing at Landover, in the county of Prince George and State of Maryland, have invented new and useful Improvements in Spring Bed-Bottoms, of which the following is a specification.

Our invention relates to improvements in spring bed-bottoms; and the object of the same is to construct a device of this character which will be provided with means for tightening or loosening the springs, so as to take up sag of the same or to take out the bow, as desired.

The novel construction devised by us for carrying out our invention is fully described in this specification and claimed, and illustrated in the accompanying drawings, forming a part thereof, in which—

Figure 1 is a perspective of our device. Fig. 2 is a transverse section of the same. Fig. 3 is a modified form of our device.

Like numerals of reference designate like parts in the different views of the drawings.

The frame of our bed-bottom consists of two outer members 1 and two inner members 2, which are arranged parallel to each other in pairs and in contact. Bowed springs 3, having ends 4 turned down at right angles, extend transversely the members 1 and 2 and have their ends 4 inserted between the members 1 and 2. Transverse apertures 5 are formed in the members 1 and 2 to accommodate tie-rods 6, having heads 7 thereon, which bear on the outer faces of the members 1. These tie-rods 6 are threaded at 8, and nuts 9, fitted thereon, serve to clamp the members 1 and 2 together to hold the springs 3 securely in place. Turnbuckles 10 connect the ends of the tie-rods and are designed to be operated to bow the springs 3 the required amount and take up all sag. As described, our device forms a complete bed-bottom; but if it is desired to dispense with the side bars of the bed we may add dovetailed fasteners 11 to the ends of the members 1, which fasteners engage dovetailed grooves 12, formed in the posts 13 of the bed.

From the foregoing it is obvious how the turnbuckle 10 may be operated to adjust the bowing of the springs 3.

We do not wish to be limited as to details of construction, as these may be modified in many particulars without departing from the spirit of our invention.

Having thus described our invention, what we claim as new, and desire to secure by Letters Patent, is—

1. In a bed-bottom, the combination of two pair of parallel side members, bowed springs having downturned ends which ends are engaged by said side members, tie-rods passing through apertures in said side members, nuts mounted on said rods to clamp said parallel side members together to hold said springs, and turnbuckles connecting said tie-rods, substantially as described.

2. In a bed-bottom, the combination of two pair of parallel side members, bowed springs having downturned ends which ends are engaged by said side members, tie-rods passing through transverse apertures in said side members and provided with heads which bear on the outer faces of the outer member of said pairs of parallel side members, nuts mounted on said tie-rods and bearing on the inner faces of said side members to clamp them together and hold said springs, and turnbuckles connecting said tie-rods, substantially as described.

In testimony whereof we have hereunto set our hands in presence of two subscribing witnesses.

CHARLES B. WHITE.
FRANKLIN WHITE.

Witnesses:
BENNETT S. JONES,
FRANK G. RADELFINGER.